US006559383B1

(12) United States Patent
Martin

(10) Patent No.: US 6,559,383 B1
(45) Date of Patent: May 6, 2003

(54) CONNECTOR HOUSING

(75) Inventor: Dallas J. Martin, Friendswood, TX (US)

(73) Assignee: Input/Output, Inc., Stafford, TX (US)

(*) Notice: Subject to any disclaimer, the term of this patent is extended or adjusted under 35 U.S.C. 154(b) by 0 days.

(21) Appl. No.: 09/358,021

(22) Filed: Jul. 21, 1999

(51) Int. Cl.[7] .......................... H01R 4/00; H01R 39/00; H02G 15/24

(52) U.S. Cl. ........................ 174/84 R; 174/21 C; 439/8

(58) Field of Search ................................ 174/84 R, 86, 174/21 C, 74 R; 439/8

(56) References Cited

U.S. PATENT DOCUMENTS 1,957,714 A * 5/1934 Jones ......................... 173/324
3,459,873 A * 8/1969 Harris et al. .................. 174/86
3,812,455 A * 5/1974 Pearson ....................... 340/7 R
4,260,211 A * 4/1981 Mollere ..................... 339/91 B
4,351,036 A * 9/1982 Mollere ........................ 367/20
4,450,543 A * 5/1984 Neeley ........................ 367/154
5,110,224 A * 5/1992 Taylor et al. ................. 385/25

* cited by examiner

*Primary Examiner*—Dean A. Reichard
*Assistant Examiner*—William H. Mayo, III
(74) *Attorney, Agent, or Firm*—Madan, Mossman & Sriram, P.C.

(57) ABSTRACT

A flexible connector housing. The flexible connector housing includes a connector housing for receiving a pair of mating connectors. The connector housing further includes a spherical member that pivotally engages a cable housing.

21 Claims, 16 Drawing Sheets

CONNECTOR HOUSING

BACKGROUND OF THE INVENTION

This invention relates generally to connector housings and more particularly to flexible connector housings.

In marine seismic acquisition, it is a common practice to house the cabling on storage reels. Furthermore, the cabling used in marine seismic acquisition typically includes several lengths of cabling that are removably coupled using some type of cabling termination. In order to permit the cabling terminations to conform to the cylindrical outer surfaces of the storage reels, the cabling terminations typically include a soft termination, consisting of a woven fabric or rope, that permits the cabling terminations to conform to the cylindrical outer surface of the storage reel.

Conventional soft cabling terminations do not provide adequate articulation. Furthermore, the conventional soft cabling terminations do not provide adequate support for side loads. Finally, the conventional soft cabling terminations also do not provide a rugged, durable or reliable termination.

The present invention is directed to overcoming one or more of the limitations of the existing connector housings.

SUMMARY OF THE INVENTION

According to one aspect of the present invention, a flexible connector is provided that includes a connector housing, and a first cable housing. The connector housing includes a first end, a second end and a central passageway. The first end has an approximately spherical outer surface. The connector housing central passageway is adapted to receive a first connector and a second connector. The first cable housing includes a central passageway pivotally coupled to the first end of the connector housing.

According to another aspect of the present invention, a flexible cable is provided that includes a connector housing, a first connector, a first cable, a second connector, a second cable, and a first cable housing. The connector housing includes a first end, a second end and a central passageway. The first end has an approximately spherical outer surface. The first connector is positioned within the central passageway. The first cable is coupled to the first connector. The second connector is positioned within the central passageway. The second cable is coupled to the second connector. The first cable housing including a central passageway pivotally coupled to the first end of the connector housing.

According to another aspect of the present invention, a flexible coupling for coupling a first cable having a first connector to a second cable having a second connector is provided that includes a ball and a socket. The ball includes an internal passageway adapted to receive the first and second connectors. The socket is pivotally coupled to the ball including an internal passageway.

According to another aspect of the present invention, a flexible cable is provided that includes a first cable, a second cable, a ball, and a socket. The first cable includes a first connector. The second cable includes a second connector coupled to the first connector. The ball includes an internal passageway adapted to receive the first and second connectors. The socket pivotally coupled to the ball including an internal passageway.

According to another aspect of the present invention, a method of coupling a first cable to a second cable is provided that includes providing a ball and socket joint having an internal passageway for coupling the first cable to the second cable.

According to another aspect of the present invention, a lead-in assembly for removably coupling a marine seismic vessel to a marine seismic streamer is provided that includes an articulated connector assembly and an auxiliary connector assembly coupled to the articulated connector assembly.

According to another aspect of the present invention, a method of removably coupling a marine seismic streamer to a marine seismic vessel is provided that includes providing a lead-in assembly having an articulated connector assembly.

DETAILED DESCRIPTION OF THE ILLUSTRATIVE EMBODIMENTS

Figure 1:
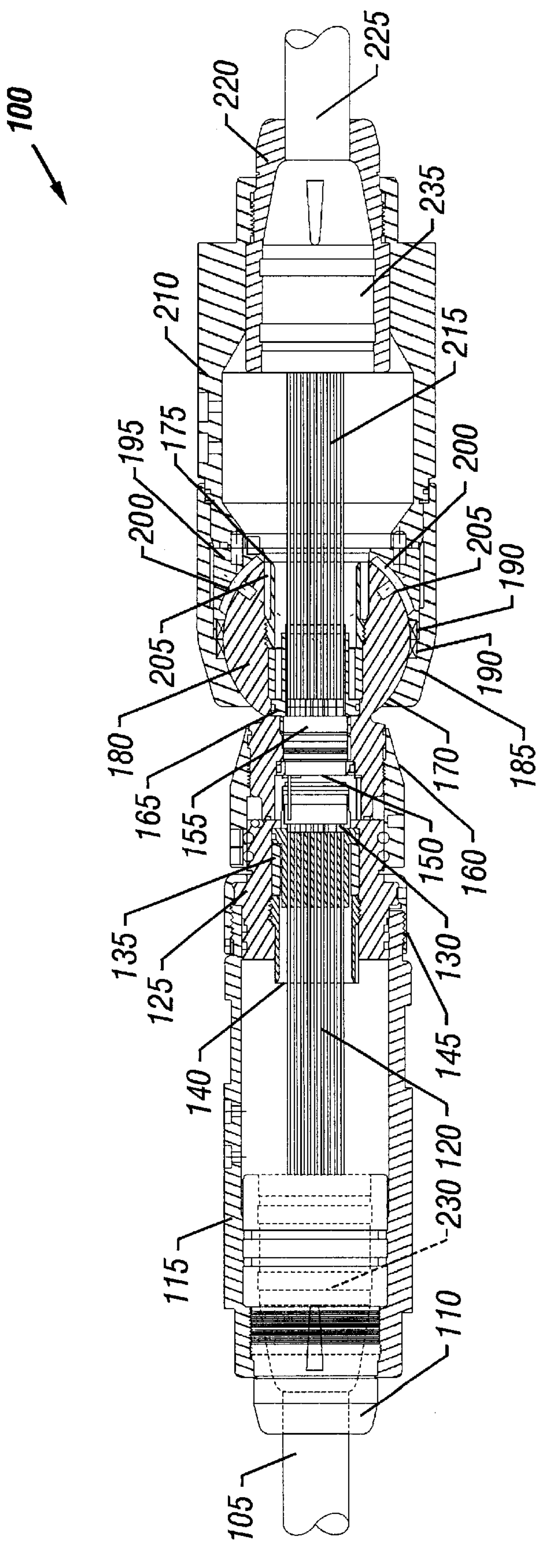
FIG. 1 is a cross-sectional illustration of an embodiment of a flexible connector housing.
Figure 1A:
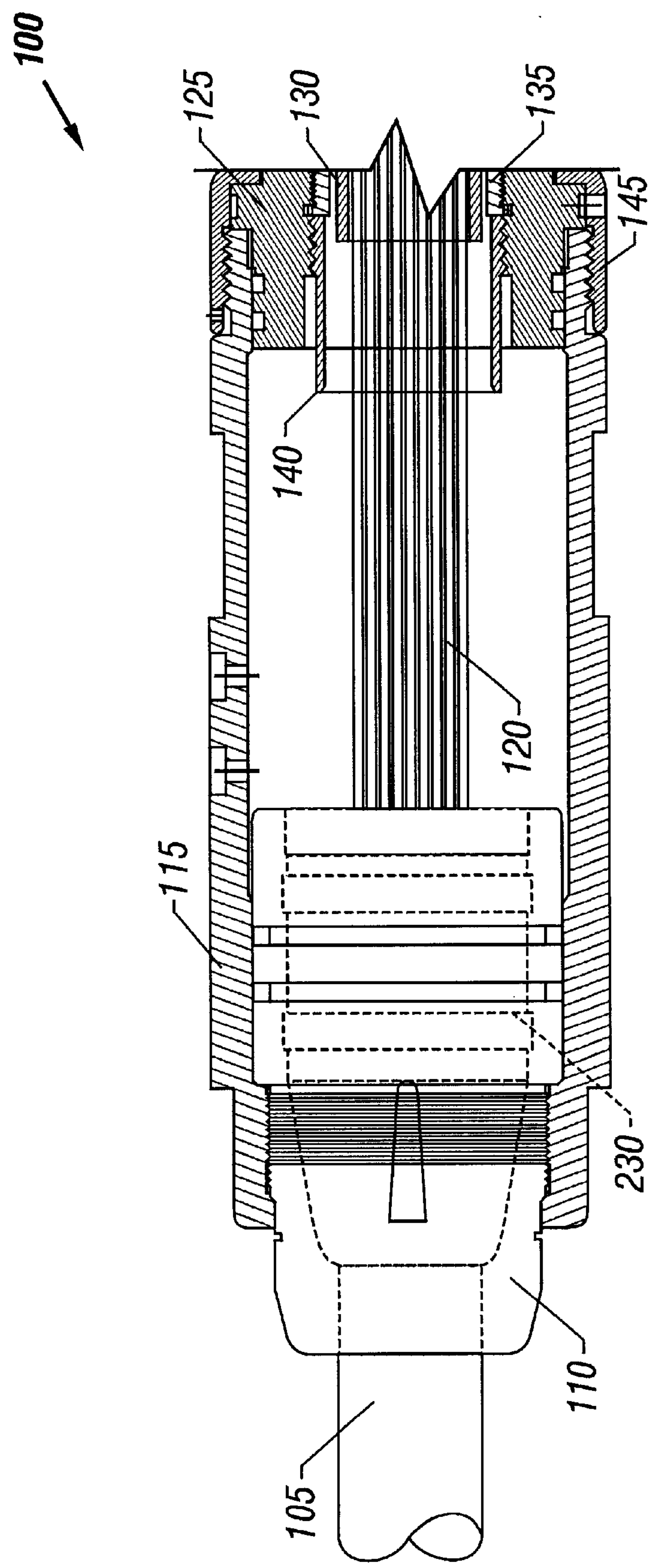
FIG. 1A is a cross-sectional illustration of a section of the flexible connector housing of FIG. 1.

A connector housing assembly is provided. The connector housing assembly includes a ball and socket joint that provides articulated motion. The connector housing further permits a first cable to be coupled to a second cable. The connector housing provides a rugged structure that permits articulated motion of the first and second cables while also protecting the first and second cables. The connector housing has wide application to the coupling of cable generally. More specifically, the present connector housing provides an improved articulated coupling for cables that is particularly suited for rugged environments.

Referring to FIGS. 1–18C, an embodiment of a flexible connector housing assembly 100 includes a first cable 105, a first cable strength member termination 110, a first sleeve 115, one or more first cable conductors 120, a housing 125, a first connector support 130, a first spacer 135, a first connector retainer 140, a coupling 145, a first mating connector 150, a second mating connector 155, a coupling ring 160, a second connector support 165, a second spacer 170, a second connector retainer 175, a ball 180, a front socket 185, spherical seals 190, a rear socket 195, one or more pockets 200, one or more stop pins 205, a second sleeve 210, one or more second cable conductors 215, a second cable strength member termination 220, and a second cable 225. In a preferred embodiment, the first cable 105, the first cable strength member termination 110, the first sleeve 115, the one or more first cable conductors 120, the housing 125, the first connector support 130, the first spacer 135, the first connector retainer 140, the coupling 145, the first mating connector 150, the second mating connector 155, the coupling ring 160, the second connector support 165, the second spacer 170, the second connector retainer 175, and the ball 180, collectively articulate relative to the front socket 185, the spherical seals 190, the rear socket 195, the one or more pockets 200, the second sleeve 210, the one or more second cable conductors 215, the second cable strength member termination 220, and the second cable 225. In this manner, the connector housing assembly 100 optimally conforms to the curved surface of a cable reel.

The first cable 105 is preferably coupled to the first cable strength member termination 110 and the first cable conductors 120. The first cable 105 may comprise any number of conventional commercially available cables such as, for example, electrical, optical or a combination of electrical and optical. In a preferred embodiment, the first cable 105 comprises a combination of an electrical and optical cable available from Input/Output, Inc. In a preferred embodiment, the first cable 105 further includes a first cable strength member 230 that mates with and is coupled to the interior of the first cable strength member termination 110. In a preferred embodiment, the first cable strength member 230 is molded onto the first cable 105.

Figure 2A:
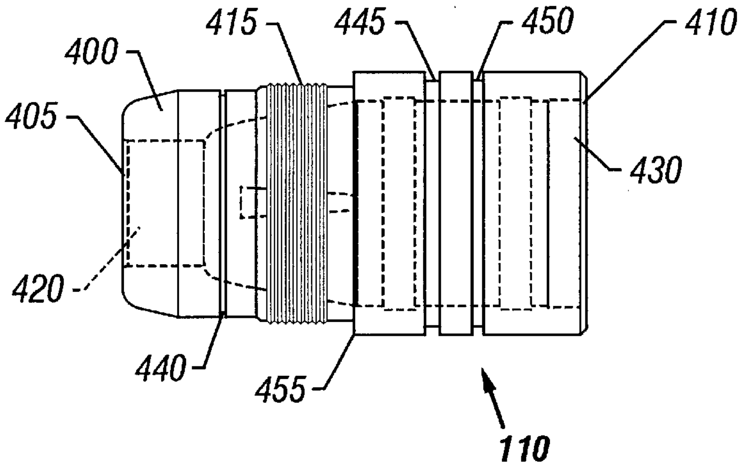
FIG. 2A is a side view of the first cable strength member termination of the flexible connector housing of FIG. 1.
Figure 2B:
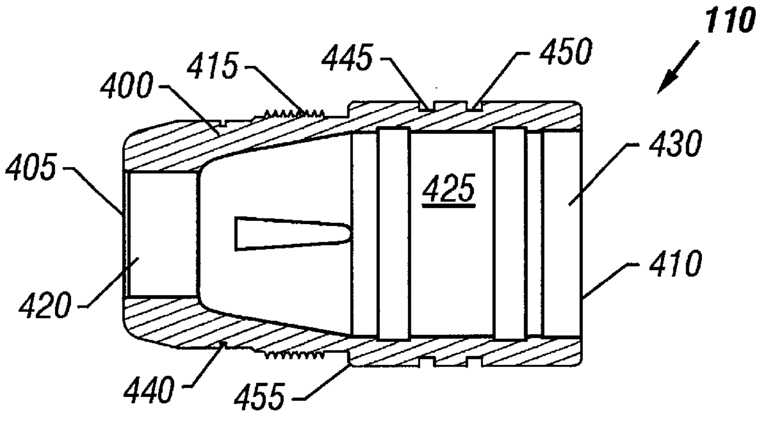
FIG. 2B is a cross-sectional illustration of the first cable strength member termination of FIG. 2A.
Figure 2C:
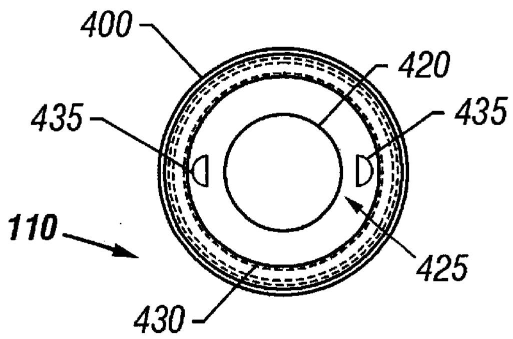
FIG. 2C is a rear view of the first cable strength member termination of FIG. 2A.

The first cable strength member termination 110 is coupled to the first cable 105 and the first sleeve 115. Referring to FIGS. 2A, 2B and 2C, in a preferred embodiment, the first cable strength member 110 includes a housing 400 having a first end 405 and a second end 410, external screw threads 415, a first opening 420, a central passageway 425, a second opening 430, keying members 435, retaining ring groove 440, O-ring grooves 445 and 450, and shoulder 455. The first cable strength member 110 preferably mates with and is removably coupled to the first sleeve 115.

The first opening 420 of the first cable strength member termination 110 is preferably adapted to receive the first cable 105. The central passageway 425 is further preferably adapted to mate with and support the first cable strength member 230. In this manner, the first cable 105 is optimally supported by the first cable strength member 230. The keying members 435 preferably are adapted to permit the position of the first cable strength member 230 to be fixed relative to the first sleeve 115. In this manner, the structural support of the first cable 105 is optimized. The retaining ring groove 440 is preferably adapted to receive a conventional retaining ring. In this manner, the first cable strength member termination 110 is removably coupled to first sleeve 115. The O-ring grooves 445 and 450 are preferably adapted to receive one or more O-rings. In this manner, the passage of fluidic materials into the interior passageway 425 of the first sleeve 115 minimized.

The first cable strength member termination 110 may be fabricated from any number of conventional commercially-available materials such as, for example, stainless steel, titanium or steel. In a preferred embodiment, the first cable strength member termination 110 is fabricated from stainless steel in order to optimally provide high strength and corrosion resistance.

Figure 3:
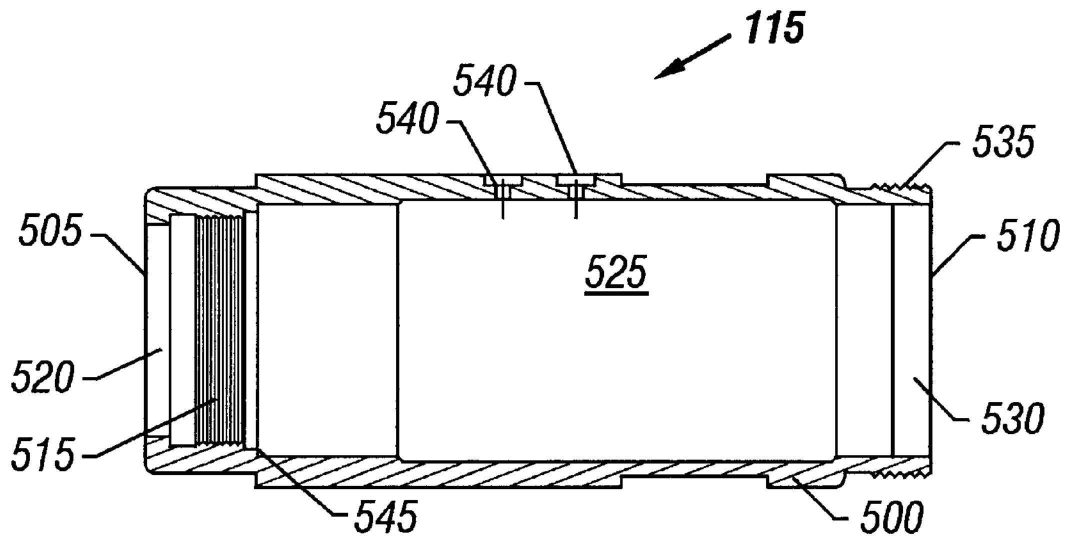
FIG. 3 is a cross-sectional view of the first sleeve of the flexible connector housing of FIG. 1.

The first sleeve 115 is preferably removably coupled to the first cable strength member termination 110, the connector housing 125, and the coupling 145. Referring to FIG. 3, in a preferred embodiment, the first sleeve 115 includes a housing 500 having a first end 505 and a second end 510, internal screw threads 515, a first opening 520, a central passageway 525, a second opening 530, external screw threads 535, one or more resealable openings 540, a shoulder 545.

The first end 505 of the first sleeve 115 preferably mates with and supports the first cable strength member 110. In a preferred embodiment, the internal screw threads 515 of the first sleeve 115 cooperatively interact with the external screw threads 415 of the first cable strength member 110. In this manner, the first cable strength member 110 is removably coupled to the first sleeve 115. In a preferred embodiment, the shoulder 455 of the first cable strength member 110 is further positioned in intimate contact with the shoulder 545 of the first sleeve 115. In this manner, the final position of the first cable strength member 110 is defined and rigidly supported.

The second end 510 of the first sleeve 115 preferably mates with and supports the housing 125 and the coupling 145. In a preferred embodiment, the external screw threads 535 of the first sleeve 115 cooperatively interact with the coupling 145. In this manner, the coupling 145 optimally removably couples the housing 125 to the first sleeve 115. In a preferred embodiment, at least a portion of the housing 125 is positioned within and mates with the second end 510 of the first sleeve 115.

In a preferred embodiment, the resealable openings 540 permit the interior passage 525 of the first sleeve 115 to be drained of moisture and/or filled with a conventional waterproof potting compound. In this manner, the first cable conductors 120 are optimally protected from moisture and other foreign materials.

The first sleeve 115 may be fabricated from any number of conventional commercially available materials such as, for example, stainless steel, titanium or steel. In a preferred embodiment, the first sleeve 115 is fabricated from stainless steel in order to optimally provide high strength and corrosion resistance.

The first cable conductors 120 are coupled to the cable 105, first cable strength member termination 110, and the first mating connector 150. The first cable conductors 120 may comprise any number of conventional commercially available signal conductors such as, for example, copper wire or fiber optic fibers.

Figure 4:
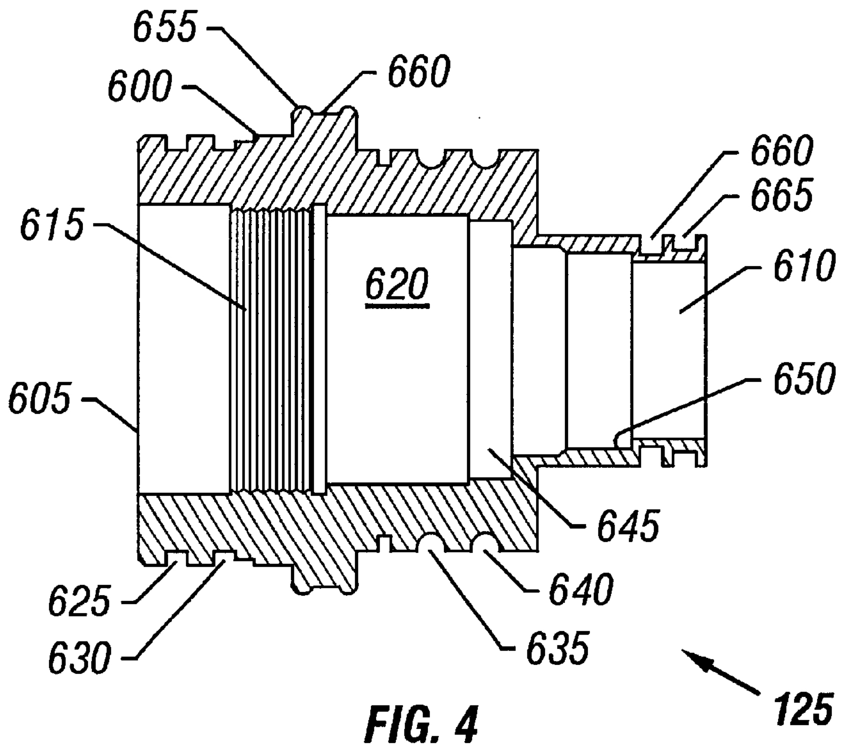
FIG. 4 is a cross-sectional view of the housing of the flexible connector housing of FIG. 1.

The housing 125 is preferably removably coupled to the first sleeve 115, the first connector support 130, the first spacer 135, the first connector retainer 140, the coupling 145, the first mating connector 150, the coupling ring 160, and the ball 180. Referring to FIG. 4, in a preferred embodiment, the housing 125 includes a body 600 having a first end 605 and a second end 610, internal screw threads 615, a central passageway 620, O-ring grooves 625 and 630, ball bearing races 635 and 640, shoulder 645, shoulder 650, rim 655, and rim O-ring groove 660.

In a preferred embodiment, the first end 605 of the housing 125 is contained within and mates with the second end 510 of the first sleeve 115. In a preferred embodiment, the rim 655 of the housing 125 is further positioned in intimate contact with the second end 510 of the first sleeve 115. In this manner, the position of the housing 125 is optimally defined and structurally supported. In a preferred embodiment, the first end 605 of the housing 125 is further removably coupled to the second end 510 of the first sleeve 115 by the coupling 145. In a particularly preferred embodiment, the first end 605 of the housing 125 is further removably coupled to the second end 510 of the first sleeve 115 by removable engagement of the rim 655 by the coupling 145.

In a preferred embodiment, the second end 610 of the housing 125 is contained within and mates with the ball 180. In this manner, the position of the housing 125 is optimally defined and structurally supported. In a preferred embodiment, the coupling ring 160 is removably and movably coupled to the exterior surface of the housing 125. In this manner, the coupling ring 160 may be rotated about the housing 125. In this manner, the coupling of the housing 125 to the ball 180 is optimally facilitated.

In a preferred embodiment, one or more conventional O-ring sealing members are positioned and supported in the O-ring grooves 625, 630 and 660. In this manner, the introduction of fluidic materials into the interior passages 525 and 620 of the first sleeve 115 and housing 125 is minimized.

In a preferred embodiment, the first connector support 130, the first spacer 135, the first connector retainer 140, and the first mating connector 150 are positioned and supported within the passageway 620. In a preferred embodiment, the first connector retainer 140 is removably coupled to the internal threads 615 of the housing 125. In a preferred embodiment, the first spacer 135 is positioned between the first connector support 130 and the first connector retainer 140. In a preferred embodiment, the first connector support 130 is positioned in intimate contact and mates with the shoulder 645. In a preferred embodiment, the first mating connector 150 is positioned in intimate contact with and mates with the shoulder 650.

The housing 125 may be fabricated from any number of conventional commercially available materials such as, for example, steel, titanium or stainless steel. In a preferred embodiment, the housing 125 is fabricated from stainless steel in order to optimally provide high strength and corrosion resistance.

Figure 5:
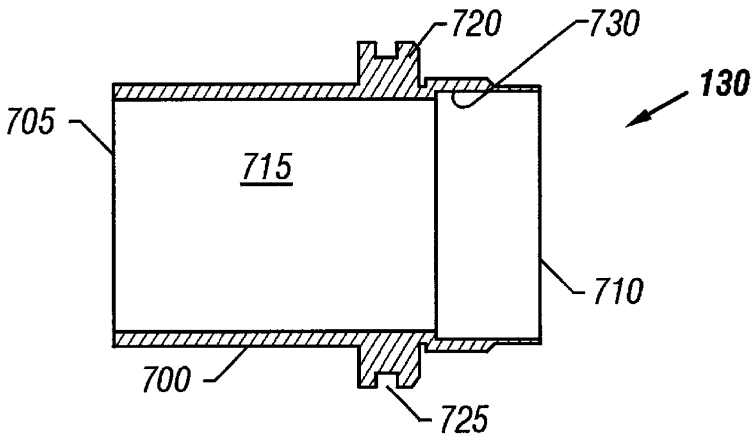
FIG. 5 is a cross-sectional view of the first connector support of the flexible connector housing of FIG. 1.

The first connector support 130 is preferably removably positioned within the housing 125. The first connector support 130 is further preferably coupled to the first spacer 135, the first connector retainer 140 and the first mating connector 150. In this manner, the first connector support 130 supports the first mating connector 150 within the housing 125. Referring to FIG. 5, in a preferred embodiment, the first connector support 130 includes a housing 700 having a first end 705 and a second end 710, a central passageway 715, a rim 720, a rim O-ring groove 725, and a shoulder 730.

In a preferred embodiment, the first end 705 of the first connector support 130 is positioned within the housing 125 and the first spacer 135. In a preferred embodiment, the rim 720 is further positioned between and in intimate contact with the end of the first spacer 135 and the shoulder 645 of the housing 125. In this manner, the first connector support is optimally supported. In a preferred embodiment, the second end 710 of the first connector support 130 is positioned in and supported by the second end 610 of the housing 125. In a preferred embodiment, the O-ring groove 725 includes one or more O-rings for sealing off the mating connectors 150 and 155. In this manner, the entry of fluidic materials into the mating connectors 150 and 155 is minimized.

The first connector support 130 may be fabricated from any number of conventional commercially available materials such as, for example, stainless steel, titanium or aluminum. In a preferred embodiment, the first connector support 130 is fabricated from stainless steel in order to optimally provide high strength and corrosion resistance.

Figure 6:
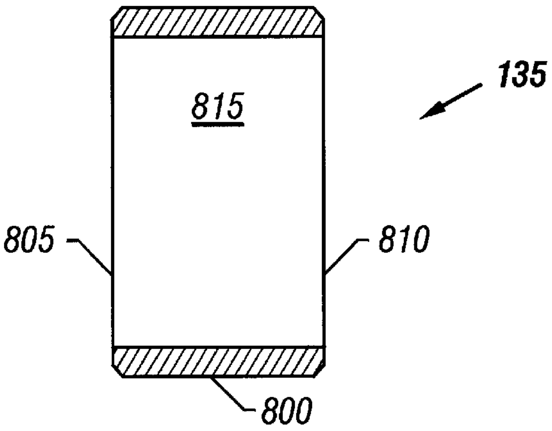
FIG. 6 is a cross-sectional view of the first spacer of the flexible connector housing of FIG. 1.

The first spacer 135 is preferably removably positioned within the housing 125. The first spacer 135 is further preferably coupled to and positioned between the first connector support 130 and the first connector retainer 140. In this manner, the first spacer 135 supports the first connector support 135 and first mating connector 150 within the housing 125. Referring to FIG. 6, in a preferred embodiment, the first spacer 135 includes a housing 800 having a first end 805 and a second end 810, and a central passageway 815.

In a preferred embodiment, the first spacer 135 is positioned within the housing 125. In a preferred embodiment, the first end 805 of the first spacer 135 is further positioned in intimate contact with the end of the first connector retainer 140 and the second end 810 of the first spacer 135 in intimate contact with the first end 705 of the first connector support 130. In this manner, the first spacer 135 provides structural support to the first mating connector 150.

In a preferred embodiment, the first spacer 135 includes two annular members, each having semi-circular annular cross sections, that are placed in intimate contact. In this manner, the two annular members together provide a tubular spacer.

The first spacer 135 may be fabricated from any number of conventional commercially available materials such as, for example, steel, aluminum or plastic. In a preferred embodiment, the first spacer 135 is fabricated from plastic in order to optimally provide a low cost spacer.

Figure 7:
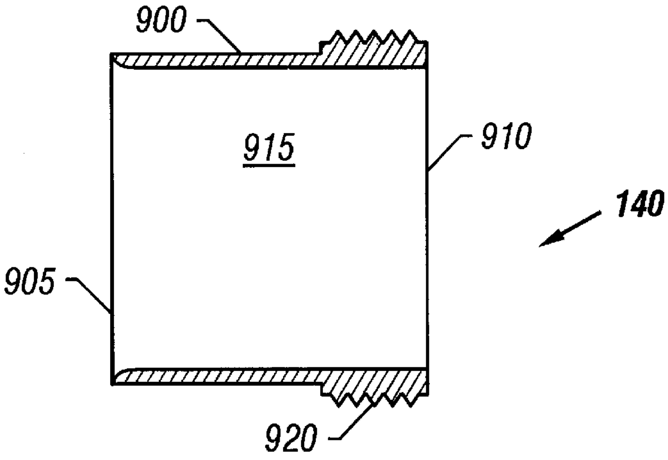
FIG. 7 is a cross-sectional view of the first connector retainer of the flexible connector housing of FIG. 1.

The first connector retainer 140 is preferably removably positioned 25 within the housing 125. The first connector retainer 140 is further preferably coupled to the first connector support 130, the first spacer 135, and the first mating connector 150. In this manner, the first connector retainer 140 supports and provides structural support for the first mating connector 150 within the housing 125. Referring to FIG. 7, in a preferred embodiment, the first connector retainer 140 includes a housing 900 having a first end 905 and a second end 910, a central passageway 915, and external screw threads 920.

In a preferred embodiment, the first end 905 of the first connector retainer 140 is at least partially positioned within the first end 605 of the housing 125 and the second end 910 of the first connector retainer 140 is removably coupled to the first end 605 of the housing 125. In a preferred embodiment, the external screw threads 920 of the first connector retainer 140 are removably coupled to the internal screw threads 615 of the housing 125. In this manner, the first connector support 130, the first spacer 135 and the first mating connector 150 are removably mounted within the housing 125. In a preferred embodiment, the second end 910 of the first connector retainer 140 is positioned in intimate contact with the first end 805 of the first spacer 135. In this manner, the first connector retainer 140 rigidly supports the first mating connector 150 within the housing 125.

The first connector retainer 140 may be fabricated from any number of conventional commercially available materials such as, for example, stainless steel, aluminum or titanium. In a preferred embodiment, the first connector retainer 140 is fabricated from stainless steel in order to optimally provide high strength and corrosion resistance.

Figure 8:
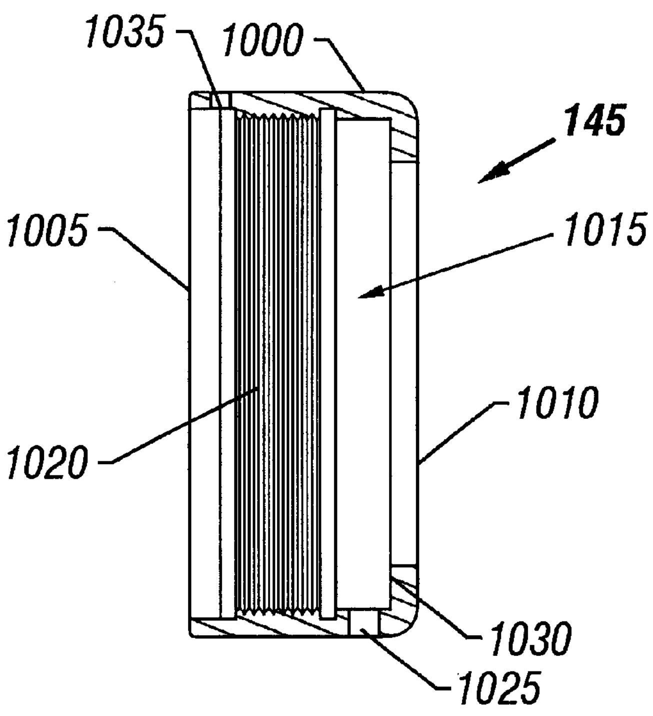
FIG. 8 is a cross-sectional view of the coupling of the flexible connector housing of FIG. 1.

The coupling 145 is preferably removably and threadably coupled to the second end 510 of the first sleeve 115. The coupling 145 is further preferably removably coupled to the rim 655 of the housing 125. In this manner, the first sleeve 115 is optimally removably coupled the housing 125 using the coupling 145. Referring to FIG. 8, in a preferred embodiment, the coupling 145 includes a housing 1000 having a first end 1005 and a second end 1010, a passageway 1015, internal screw threads 1020, a resealable passage 1025, and a shoulder 1030, and a resealable passage 1035.

In a preferred embodiment, the first end 1005 of the coupling 145 removably and threadably coupled to the second end 510 of the first sleeve 115. In a preferred embodiment, the internal screw threads 1020 of the coupling 145 are removably coupled to the external screw threads 535 of the first sleeve 115. In a preferred embodiment, the shoulder 1030 of the coupling 145 is positioned in intimate contact with the rim 655 of the housing 125. this manner, the coupling 145 optimally removably couples the first sleeve 115 to the housing 125.

In a preferred embodiment, set screws are threaded into the resealable passages 1025 and/or 1035 in order to optimally fix the position of the coupling 145 to the first sleeve 115 and/or the housing 125.

The coupling 145 may be fabricated from any number of conventional commercially available materials such as, for example, stainless steel, titanium or steel. In a preferred embodiment, the coupling 145 is fabricated from stainless steel in order to optimally provide high strength and corrosion resistance.

The first mating connector 150 is preferably removably coupled to the first connector support 130 and the second mating connector 155. The first mating connector 150 is further preferably coupled to the first cable conductors 120. The first mating connector 150 may comprise any number of conventional commercially available mating connectors such as, for example, Veam, Bendix or Cannon. In a preferred embodiment, the first mating connector 150 comprises a Veam available from Input/Output, Inc. In a preferred embodiment, the first mating connector 150 is positioned in intimate contact with the shoulder 730 of the first connector support 130. In this manner, the position of the first mating connector 150 is optimally defined and structurally supported.

Figure 9:
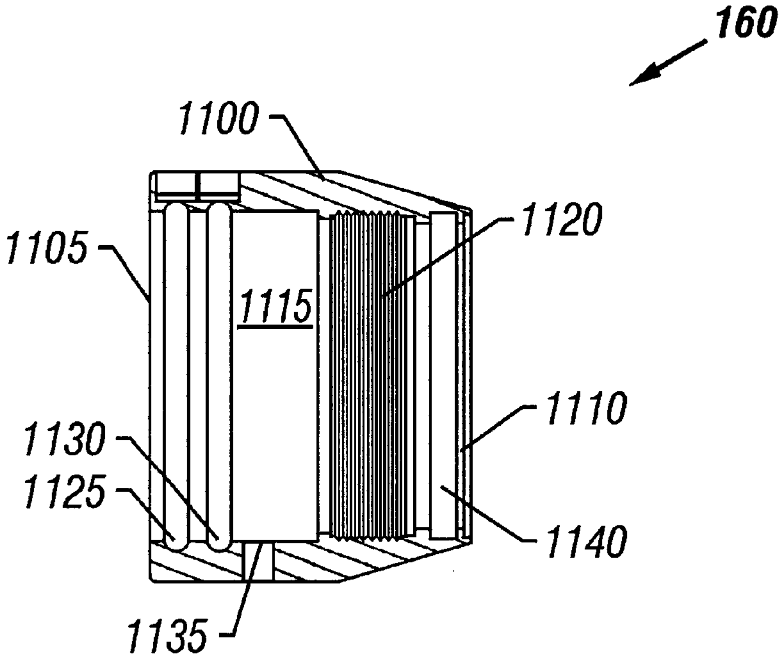
FIG. 9 is a cross-sectional view of the coupling ring of the flexible connector housing of FIG. 1.

The second mating connector 155 is preferably removably coupled to the second connector support 165 and the first mating connector 150. The second mating connector 155 is further preferably coupled to the second cable conductors 215. The second mating connector 155 may comprise any number of conventional commercially available mating connectors such as, for example, Veam, Bendix or Cannon. In a preferred embodiment, the second mating connector 155 comprises a Veam available from Input/Output, Inc;

The coupling ring 160 is preferably removably and movably coupled to the housing 125 and the ball 180. In this manner, the housing 125 and ball 180 are optimally removably coupled. Referring to FIG. 9, in a preferred embodiment, the coupling ring 160 includes a housing 1100 having a first end 1105 and a second end 1110, a passageway 1115, internal screw threads 1120, mounting grooves 1125 and 1130, and a coupling groove 1140.

In a preferred embodiment, the first end 1105 of the coupling ring 160 is removably and movably coupled to the second end 610 of the housing 125. In a preferred embodiment, the mounting grooves 1125 and 1130 of the coupling ring are movably coupled to the ball bearing races 635 and 640 of the housing 125 using conventional coupling devices such as, for example, spherical balls. In this manner, the first end 1105 of the coupling ring 160 is supported by and movably coupled to the second end 610 of the housing 125.

In a preferred embodiment, the second end 1110 of the coupling ring 160 is removably and movably coupled to the ball 180. In a preferred embodiment, the internal screw threads 1120 are removably coupled to the ball 180. In this manner, the housing 125 is removably optimally coupled to the ball 180.

The coupling ring 160 may be fabricated from any number of conventional commercially available materials such as, for example, stainless steel, titanium or steel. In a preferred embodiment, the coupling ring 160 is fabricated from stainless steel in order to optimally provide high strength and corrosion resistance.

Figure 10:
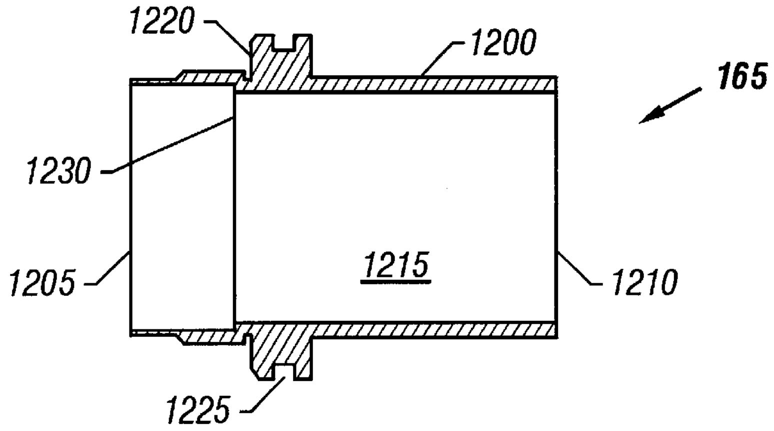
FIG. 10 is a cross-sectional view of the second connector support of the flexible connector housing of FIG. 1.

The second connector support 165 is preferably removably positioned within the ball 180. The second connector support 165 is further preferably coupled to the second spacer 170, the second connector retainer 175 and the second mating connector 155. In this manner, the second connector support 165 supports the second connector 150 within the ball 180. Referring to FIG. 10, in a preferred embodiment, the second connector support 165 includes a housing 1200 having a first end 1205 and a second end 1210, a central passageway 1215, a rim 1220, a rim O-ring groove 1225, and a shoulder 1230.

In a preferred embodiment, the second connector support 165 is positioned within and supported by the ball 180. In a preferred embodiment, the rim 1220 is further positioned between and in intimate contact with the end of the second spacer 170 and the ball 180. In this manner, the second connector support 165 is optimally supported. In a preferred embodiment, the O-ring groove 1225 includes one or more O-rings for sealing off the mating connectors 150 and 155. In this manner, the entry of fluidic materials into the mating connectors 150 and 155 is minimized. In a preferred embodiment, the second mating connector 155 is positioned in intimate contact with the shoulder 1230 of the second connector support 165. In this manner, the position of the second mating connector 155 is optimally defined and structurally supported.

The first connector support 165 may be fabricated from any number of conventional commercially available materials such as, for example, stainless steel, titanium or aluminum. In a preferred embodiment, the second connector support 165 is fabricated from stainless steel in order to optimally provide high strength and corrosion resistance.

Figure 11:
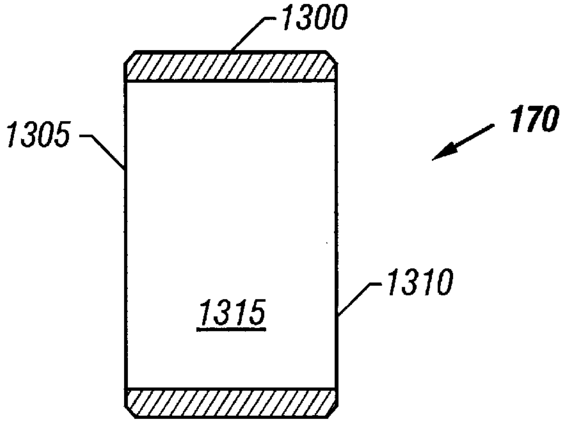
FIG. 11 is a cross-sectional view of the second spacer of the flexible connector housing of FIG. 1.

The second spacer 170 is preferably removably positioned within the ball 180. The second spacer 170 is further preferably coupled to and positioned between the second connector support 165 and the second connector retainer 175. In this manner, the second spacer 170 supports the second connector support 165 and second mating connector 155 within the ball 180. Referring to FIG. 11, in a preferred embodiment, the second spacer 170 includes a housing 1300 having a first end 1305 and a second end 1310, and a central passageway 1315.

In a preferred embodiment, the second spacer 170 is positioned within the ball 180. In a preferred embodiment, the first end 1305 of the second spacer 170 is further positioned in intimate contact with the rim 1220 of the second connector support 165 and the second end 1310 of the second spacer 170 is positioned in intimate contact with the end of the second connector retainer 175. In this manner, the second spacer 170 provides structural support for the second mating connector 155.

In a preferred embodiment, the second spacer 170 includes two annular members, each having semi-circular annular cross sections, that are placed in intimate contact. In this manner, the two annular members together provide a tubular spacer.

The second spacer 170 may be fabricated from any number of conventional commercially available materials such as, for example, steel, aluminum or plastic. In a preferred embodiment, the second spacer 170 is fabricated from plastic in order to optimally provide a low cost spacer.

Figure 12:
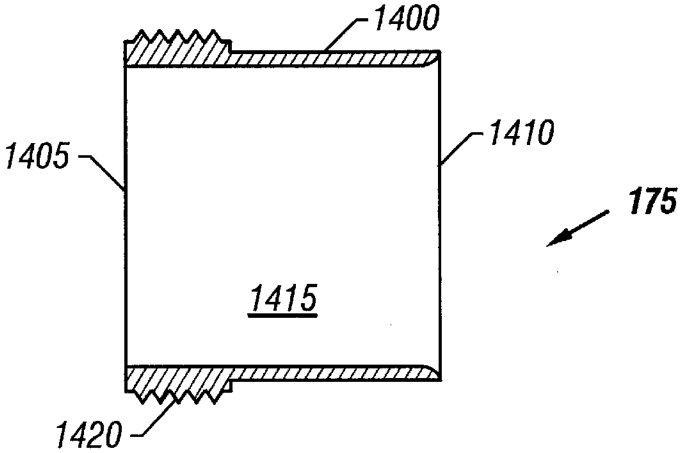
FIG. 12 is a cross-sectional view of the second connector retainer of the flexible connector housing of FIG. 1.
Figure 13:
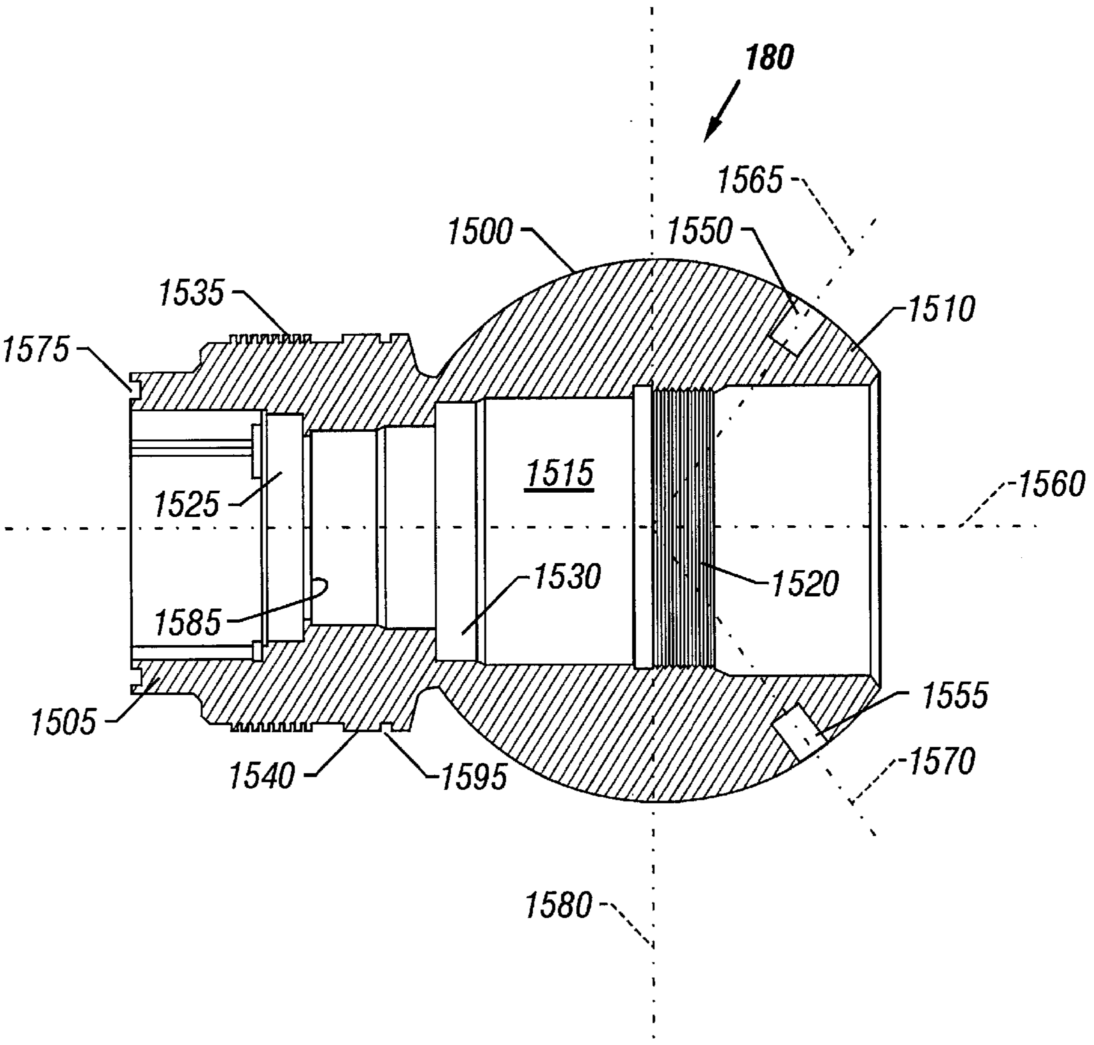
FIG. 13 is a cross-sectional illustration of the ball of the flexible connector housing of FIG. 1.
Figure 13A:
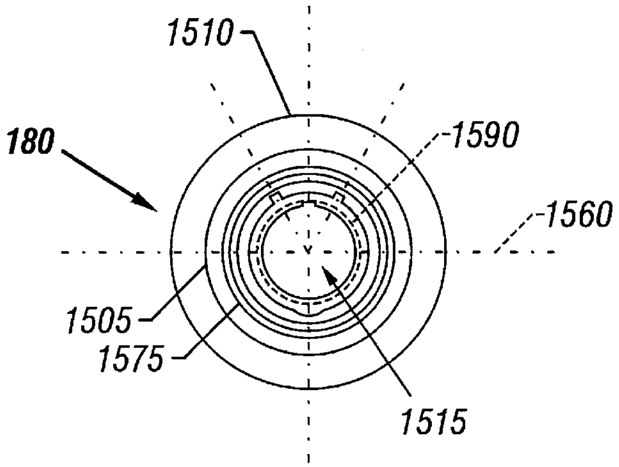
FIG. 13A is a rear view of the ball of FIG. 13.
Figure 13B:
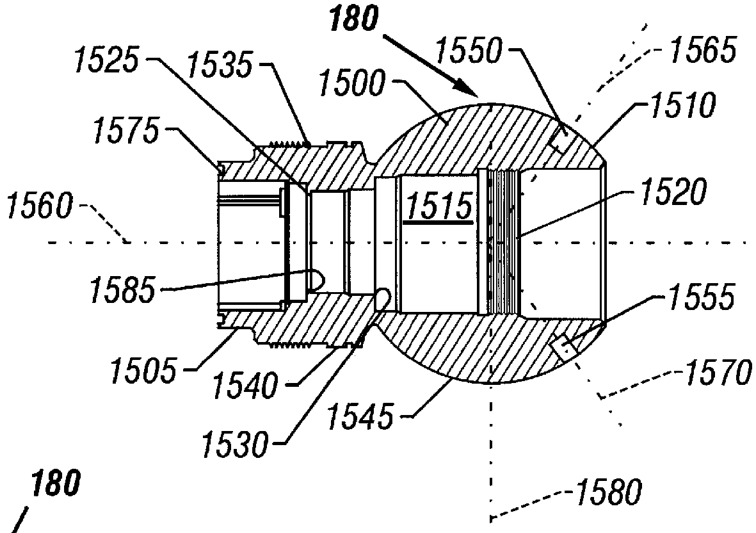
FIG. 13B is a cross-sectional illustration of the ball of FIG. 13.
Figure 13C:
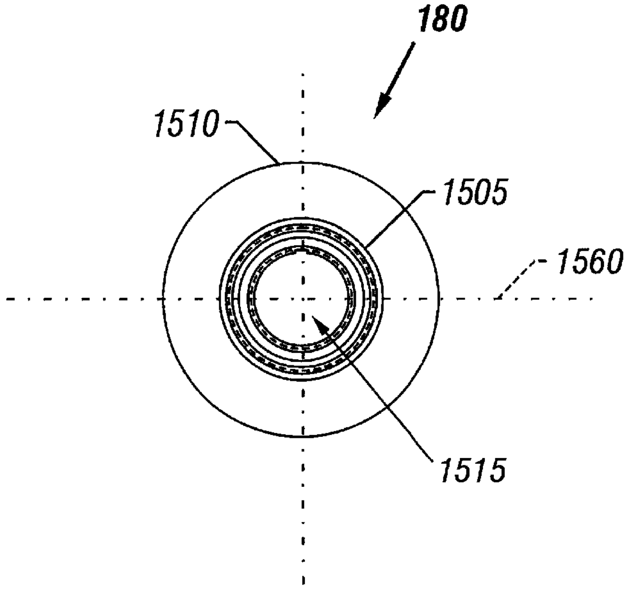
FIG. 13C is a front view of the ball of FIG. 13.
Figure 14A:
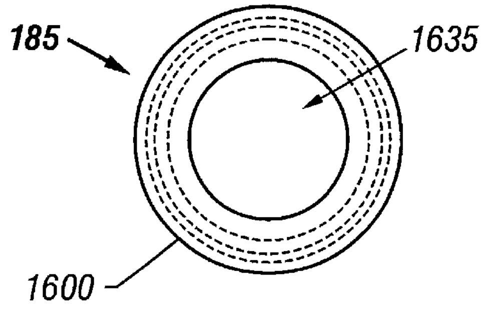
FIG. 14A is a front view of the front socket of the flexible connector housing of FIG. 1.
Figure 14B:
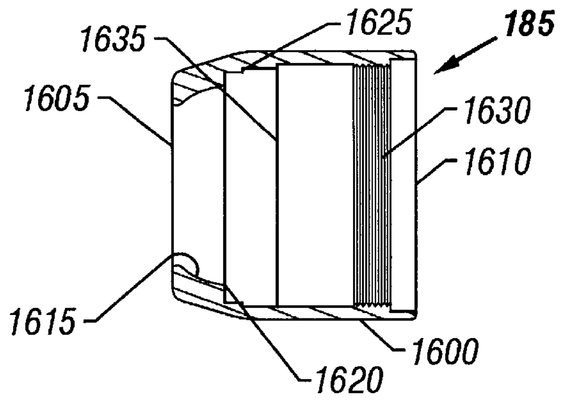
FIG. 14B is a cross-sectional illustration of the front socket of the flexible connector housing of FIG. 1.
Figure 14C:
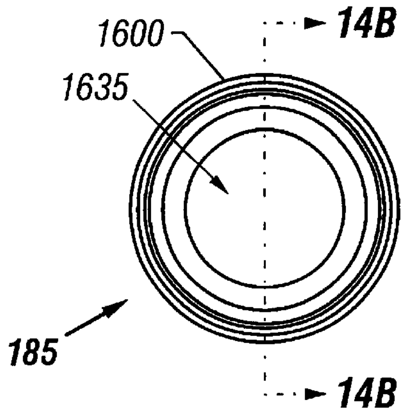
FIG. 14C is a rear view of the front socket of the flexible connector housing of FIG. 1.
Figure 14D:
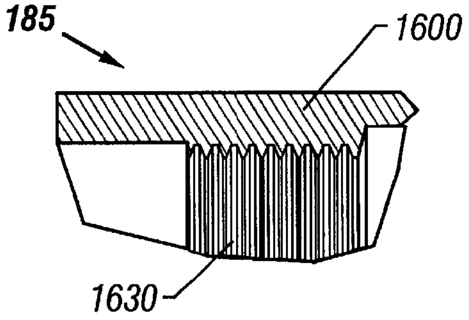
FIG. 14D is a cross-sectional illustration of a portion of the front socket of FIG. 14B.
Figures 15A, 15B, 15C, 15D, 15E:
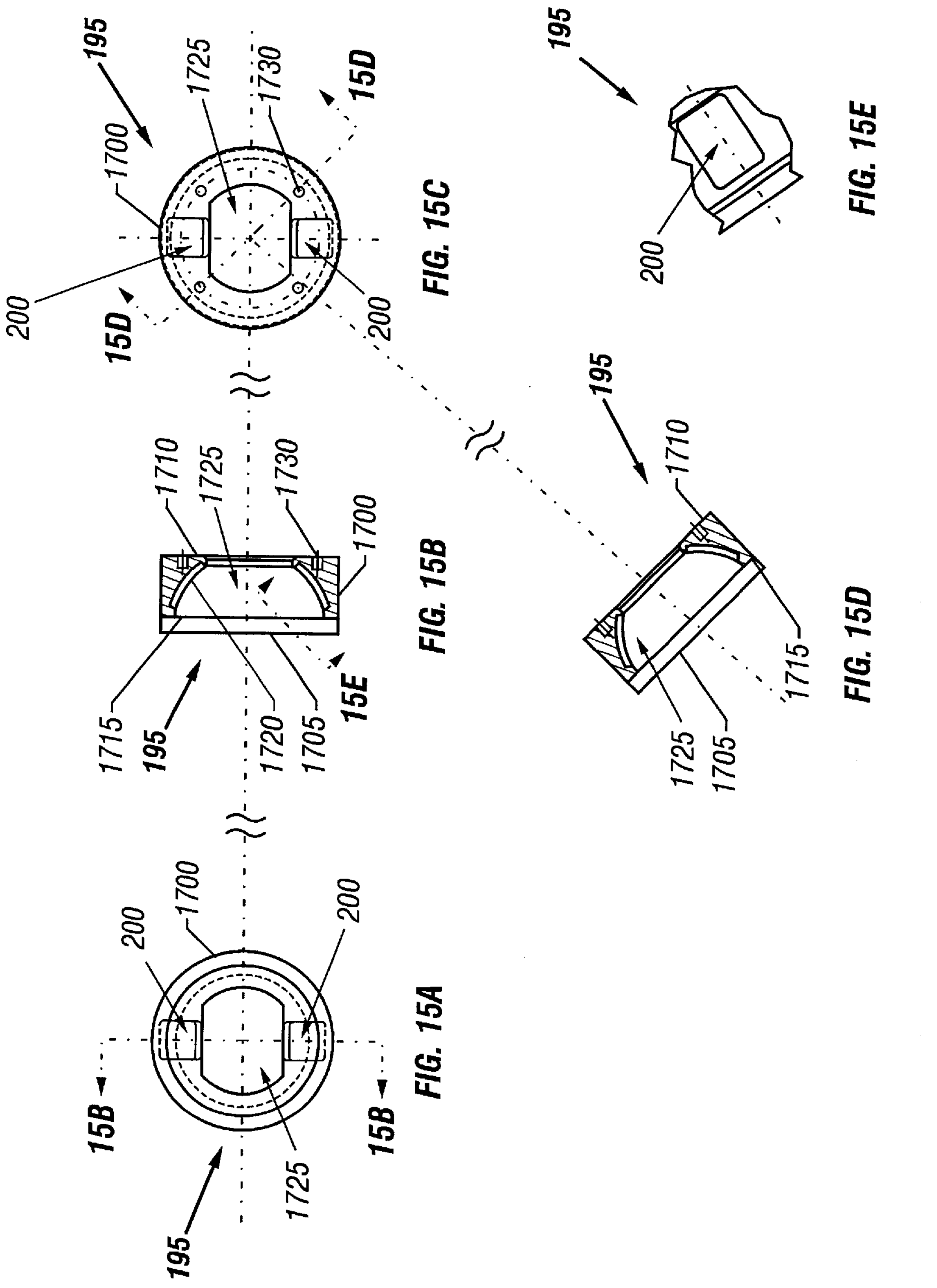
FIG. 15A is a front view of the rear socket of the flexible connector housing of FIG. 1.
FIG. 15B is a cross-sectional illustration of the rear socket of FIG. 15A.
FIG. 15C is a rear view of the rear socket of the flexible connector housing of FIG. 1.
FIG. 15D is a cross-sectional illustration of the rear socket of FIG. 15C.
FIG. 15E is an illustration of a portion of the rear socket of FIG. 15B.
Figure 16A:
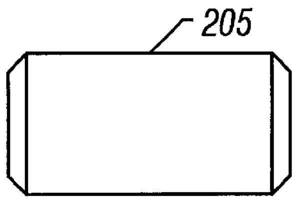
FIG. 16A is a side view of the stop pin of the flexible connector housing of FIG. 1.
Figure 16B:
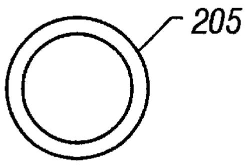
FIG. 16B is a front view of the stop pin of FIG. 16A.
Figure 17A:
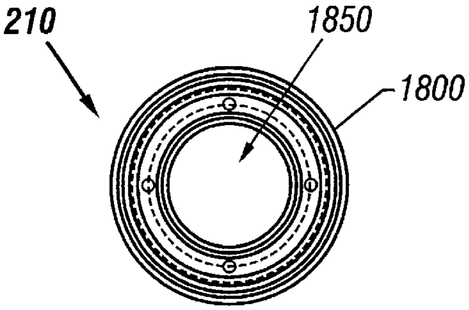
FIG. 17A is a front view of the second sleeve of the flexible connector housing of FIG. 1.
Figure 17B:
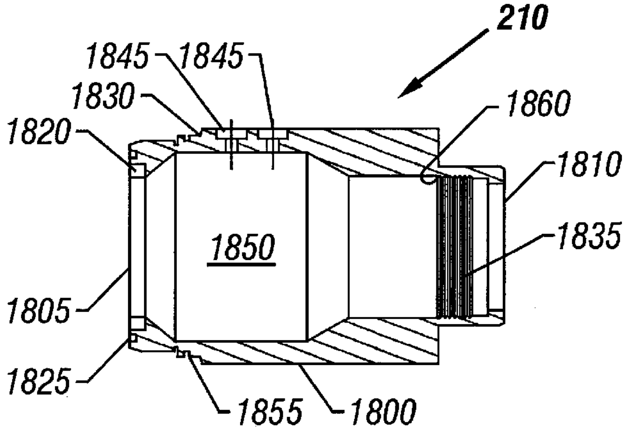
FIG. 17B is a cross-sectional illustration of the second sleeve of the flexible connector housing of FIG. 1.
Figure 17C:
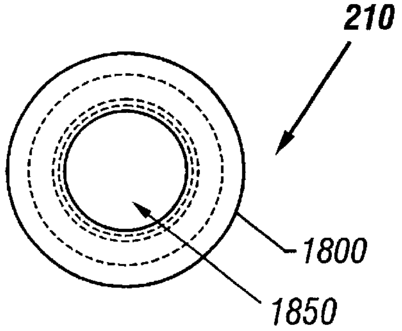
FIG. 17C is a rear view of the second sleeve of the flexible connector housing of FIG. 1.
Figure 17D:
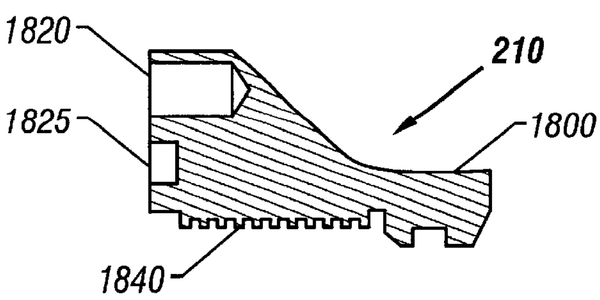
FIG. 17D is a cross-sectional illustration of a portion of the second sleeve of the flexible connector housing of FIG. 1.

The second connector retainer 175 is preferably removably positioned within the ball 180. The second connector retainer 175 is further preferably coupled to the second mating connector 155, the second connector support 165, and the second spacer 170. In this manner, the second connector retainer 175 supports and provides structural support for the second mating connector 155 within the ball 180. Referring to FIG. 12, in a preferred embodiment, the second connector retainer 175 includes a housing 1400 having a first end 1405 and a second end 1410, a central passageway 1415, and external screw threads 1420.

In a preferred embodiment, the first end 1405 of the second connector retainer 175 is positioned in intimate contact with the second end 1310 of the second spacer 170. In this manner, the second connector retainer 175 rigidly supports the second mating connector 155 within the ball 180. In a preferred embodiment, the first end 1405 of the second connector retainer 175 is removably coupled to the ball 180 and the second end 1410 of the second connector retainer 175 is at least partially positioned within the ball 180. In a preferred embodiment, the external screw threads 1420 of the second connector retainer 175 are further removably coupled to the ball 180. In this manner, the second connector support 165, the second spacer 170 and the second mating connector 155 are removably mounted within the ball 180.

The second connector retainer 175 may be fabricated from any number of conventional commercially available materials such as, for example, stainless steel, aluminum or titanium. In a preferred embodiment, the second connector retainer 175 is fabricated from stainless steel in order to optimally provide high strength and corrosion resistance.

The ball 180 is preferably removably coupled to the housing 125, the second mating connector 155, the coupling ring 160, the second connector support 165, the second spacer 170, the second connector retainer 175, and the stop pins 205. The ball 180 is also preferably movably coupled to the front socket 185, the spherical seals 190, the rear socket 195, and the pockets 200. The range of motion of the ball 180 is further preferably limited by and defined by the interaction of the stop pins 205 and the pockets 200. In this manner, the ball 180 preferably articulates relative to the front socket 185 and the rear socket 195. This optimally provides a flexible connector housing that conforms to a curved surface. Referring to FIGS. 13, 13A, 13B, and 13C, in a preferred embodiment, the ball 180 includes a housing 1500 having a cylindrical end 1505 and a spherical end 1510, a passageway 1515, internal screw threads 1520, a shoulder 1525, a shoulder 1530, external screw threads 1535, coupling rim 1540, spherical outer surface 1545, stop pin mounting holes 1550 and 1555, longitudinal axis 1560, mounting hole axes 1565 and 1570, O-ring groove 1575, vertical axis 1580, shoulder 1585, and retaining ring 1590, and O-ring groove 1595.

In a preferred embodiment, the cylindrical end 1505 of the ball 180 is removably coupled to the second end 610 of the housing 125 and the coupling ring 160. In a preferred embodiment, the external screw threads 1535 of the ball 180 are removably coupled to the internal screw threads 1120 of the coupling ring 160. In a preferred embodiment, the coupling rim 1540 further is removably coupled to the coupling ring 160 by a conventional O-ring provided in the O-ring groove 1595. In this manner, the cylindrical end 1505 of the ball 180 is removably coupled to the second end 610 of the housing 125.

In a preferred embodiment, the spherical end 1510 of the ball 180 is movably coupled to the front socket 185, the spherical seals 190, and the rear socket 195. In a preferred embodiment, the radial clearance between the spherical end 1510 of the ball 180 and the front socket 185 and the rear socket 195 ranges from about 0.001 to 0.005 inches in order to optimally provide a sliding fit. In a preferred embodiment, the clearance between the spherical seals 190 and the spherical end 1510 of the ball 180 is an interference fit ranging from around 0.025 to 0.040 inches. In this manner, the interface between the spherical end 1510 of the ball 180 and the front socket 185 and the rear socket 195 is sealed and the entry of fluidic materials is minimized.

In a preferred embodiment, the spherical end 1510 of the ball 180 includes one or more stop pin mounting holes 1550 and 1555 for mounting the stop pins 205. In a preferred embodiment, the stop pin mounting axes, 1565 and 1570, are symmetrically positioned with respect to the longitudinal axis 1560. In a preferred embodiment, the angle between the stop pin mounting axis 1565 and the longitudinal axis 1560 ranges from about 50 to 55 degrees in order to optimally provide range of motion. In a preferred embodiment, the angle between the stop pin mounting axis 1570 and the longitudinal axis 1560 ranges from about 50 to 55 degrees in order to optimally provide range of motion.

In a preferred embodiment, the O-ring groove 1575 includes one or more conventional O-rings for sealing the interface between the cylindrical end 1505 of the ball 180. In this manner, the mating connectors 150 and 155 are optimally protected from fluidic materials.

In a preferred embodiment, the ball 180 is removably coupled to the second mating connector 155, the second connector support 165, the second spacer 170, and the second connector retainer 175. In a preferred embodiment, the second mounting connector is positioned in intimate contact with and supported by the shoulder 1585. In this manner, the position of the second mating connector 155 is optimally controlled and supported. In a preferred embodiment, the rim 1220 of the second connector support 165 is positioned in intimate contact with and supported by the shoulder 1530. In this manner, the position of the second connector support 165 is optimally controlled and supported. In a preferred embodiment, the external screw threads 1420 of the second connector retainer 175 are removably coupled to the internal screw threads 1520 of the ball 180. In a preferred embodiment, the second spacer 170 is further portioned between and in intimate contact with the second connector support 165 and the second connector retainer 175. In this manner, the second mating connector 155 is removably coupled to and supported within the ball 180.

The ball 180 may be fabricated from any number of conventional commercially available materials such as, for example, steel, stainless steel or titanium. In a preferred embodiment, the ball 180 is fabricated from stainless steel in order to optimally provide high strength and corrosion resistance.

The front socket 185 is preferably removably coupled to the spherical seals 190, the rear socket 195 and the second sleeve 210. The front socket 185 is further preferably movably coupled to the spherical end 1510 of the ball 180. Referring to FIGS. 14A, 14B, 14C and 14D, in a preferred embodiment, the front socket 185 includes a housing 1600 having a first end 1605 and a second end 1610, an interior spherical surface segment 1615, a shoulder 1620, a shoulder 1625, internal screw threads 1630, and a central passage 1635.

In a preferred embodiment, the first end 1605 of the front socket 185 is positioned about and supported by the spherical surface 1545 of the spherical end 1510 of the ball 180. In this manner, the interior spherical surface segment 1615 of the front socket 185 moves and is supported on the spherical surface 1545 of the spherical end 1510 of the ball 180. In a preferred embodiment, the second end 1610 of the front socket is removably coupled to the second sleeve 210. In a preferred embodiment, one or more or the spherical seals 190 are positioned in intimate contact with the shoulder 1620. In a preferred embodiment, the end of the rear socket 195 is positioned in intimate contact with the shoulder 1625. In a preferred embodiment, the radial clearance between the spherical surface segment 1615 and the spherical surface 1545 of the spherical end 1510 of the ball 180 ranges from about 0.001 to 0.005 inches in order optimally provide a sliding fit.

The front socket 185 may be fabricated from any number of conventional commercially available materials such as, for example, stainless steel, titanium or steel. In a preferred embodiment, the front socket 185 is fabricated from stainless steel in order to optimally provide high strength and corrosion resistance.

Figure 1B:
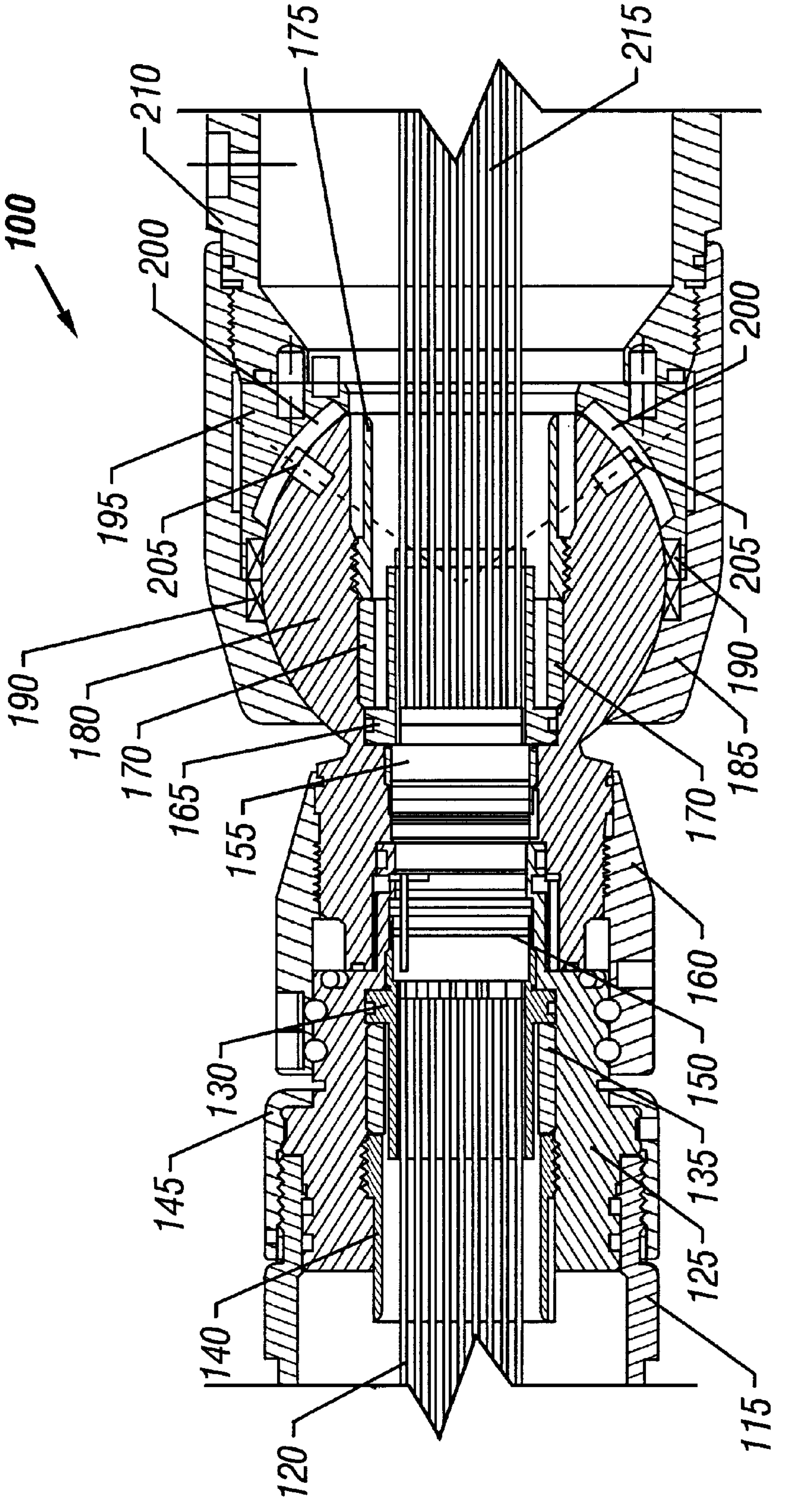
FIG. 1B is a cross-sectional illustration of a section of the flexible connector housing of FIG. 1.
Figure 1C:
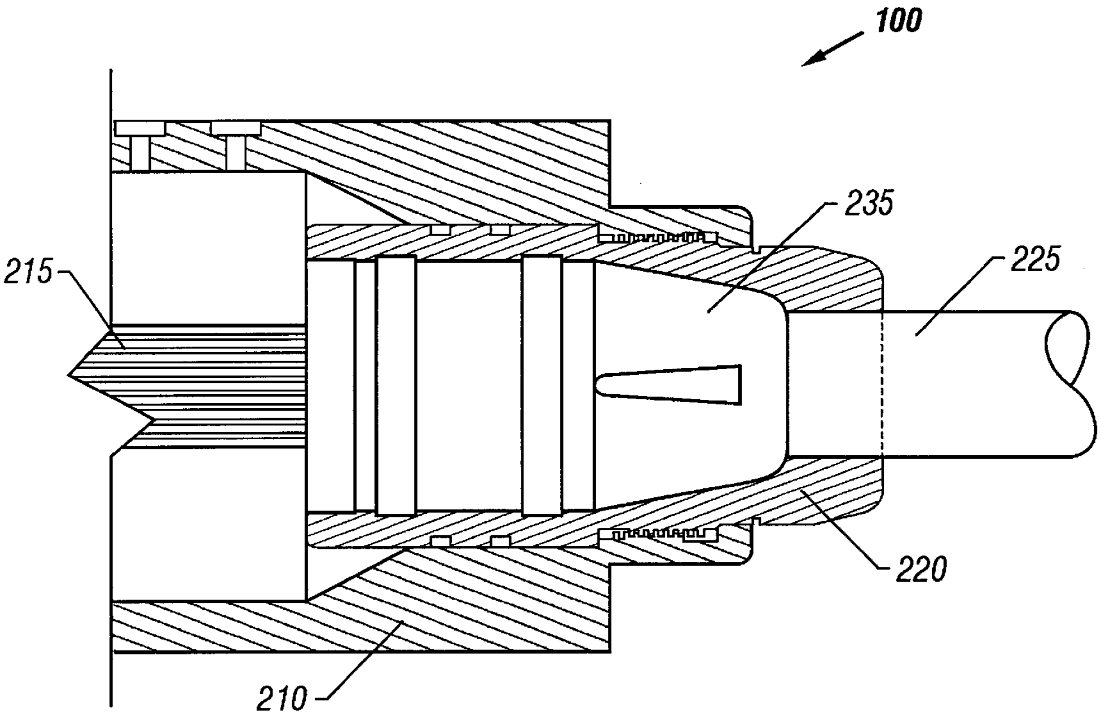
FIG. 1C is a cross-sectional illustration of a section of the flexible connector housing of FIG. 1.

The spherical seals 190 are removably coupled to the front socket 185 and the rear socket 195. The spherical seals are further preferably movably coupled to the spherical end 1510 of the ball 180. As illustrated in FIG. 1B, in a preferred embodiment, the spherical seals 190 are preferably symmetrically positioned about the spherical end 1510 of the ball 180. In a preferred embodiment, one or more of the spherical seals 190 are positioned in intimate contact with the shoulder 1620 of the front socket 185, and one or more of the spherical seals 190 are positioned in intimate contact with the end of the rear socket 195.

In a preferred embodiment, the interface between the spherical seals 190 and the spherical surface 1545 of the spherical end 1510 of the ball 180 comprises an interference fit range from about 0.025 to 0.040 inches in order to optimally prevent the passage of fluidic materials. The spherical seals 190 may comprise any number of conventional commercially available spherical seals such as, for example, O-rings, lip seals or variseals. In a preferred embodiment, the spherical seals 190 comprise variseals available from Shamban.

The rear socket 195 is preferably removably coupled to the front socket 185, the spherical seals 190, and the second sleeve 210. The rear socket 195 is further preferably movably coupled to the spherical end 1510 of the ball 180. The rear socket 195 is further adapted to limit the range of motion of the ball 180 relative to the rear socket 195. Referring to FIGS. 15A, 15B, 15C, 15D, and 15E, in a preferred embodiment, the rear socket 195 includes a housing 1700 having a first end 1705 and a second end 1710, a shoulder 1715, interior spherical surface segment 1720, one or more pockets 200, a central passage 1725, and one or more mounting holes 1730.

In a preferred embodiment, the first end 1705 of the rear socket 195 is movably coupled to and supported by the spherical end 1510 of the ball 180. In this manner, the spherical surface segment 1720 of the rear socket 195 is movably coupled to the spherical surface 1545 of the spherical end 1510 of the ball. In a preferred embodiment, the spherical surface segment 1720 of the rear socket 195 includes one or more pockets 200 positioned about the spherical surface segment 1720 for receiving corresponding stop pins 205. In this manner, the range of motion of the ball 180 relative to the rear socket 195 is limited. In a preferred embodiment, the pockets 200 have a substantially rectangular shape in order to provide a range of motion in a spherical plane. In a preferred embodiment, the range of motion of the ball 180 relative to the rear socket 195 is limited to about 15 to 20 degrees in the θ direction and about 15 to 20 degrees in the ϕ direction. In this manner, the cooperative relationship between the stop pins 205 and the pockets 200 optimally provide a limited range of motion in a define segment of a spherical plane. In a preferred embodiment, the pockets 200 are substantially symmetrically positioned about the spherical surface segment 1720.

In a preferred embodiment, the first end 1705 of the rear socket 195 is positioned in intimate contact with the shoulder 1625 of the front socket 185. In a preferred embodiment, one or more of the spherical seals 190 are further positioned in intimate contact with the shoulder 1715 of the rear socket 195. In this manner, the spherical seals 190 are preferably positioned and supported in a symmetrical fashion about the spherical end 1545 of the ball 180.

In a preferred embodiment, the second end 1710 of the rear socket 195 is removably coupled to the second sleeve 210. In a preferred embodiment, one or more mounting pins are positioned in the mounting holes 1730 for locating the rear socket 195 relative to the second sleeve 210. In a preferred embodiment, the front socket 185 is removably coupled to the second sleeve 210. In this manner, the rear socket 195 is removably coupled to front socket 185 and second sleeve 210.

The rear socket 195 may be fabricated from any number of conventional commercially available materials such as, for example, stainless steel, steel or titanium. In a preferred embodiment, the rear socket 195 is fabricated from stainless steel in order to optimally provide high strength and corrosion resistance.

The stop pins 205 are preferably removably coupled to the stop pin mounting holes 1550 and 1555 provided in the spherical end 1510 of the ball 180. In a preferred embodiment, the stop pins 205 extend approximately 0.25 to 0.31 inches from the spherical surface 1545 of the spherical end 1510 of the ball 180 in order to optimally engage with corresponding pockets 200. In a preferred embodiment, the stop pins 205 extend in a substantially perpendicular direction from the spherical surface 1545 of the spherical end 1510 of the ball 180 in order to optimally provide an interface with the pockets 200.

The stop pins 205 may be fabricated from any number of conventional commercially available materials such as, for example, steel, stainless steel or titanium. In a preferred embodiment, the stop pins 205 are fabricated from stainless steel in order to optimally provide high strength and corrosion resistance.

The second sleeve 210 is preferably removably coupled to the front socket 185, the rear socket 195, and the second cable strength termination member 220. Referring to FIGS. 17A, 17B, 17C and 17D, in a preferred embodiment, the second sleeve 210 includes a housing 1800 having a first end 1805 and a second end 1810, one or more mounting holes 1820, an O-ring groove 1825, a shoulder 1830, internal screw threads 1835, external screw threads 1840, resealable holes 1845, a central passageway 1850, an O-ring groove 1855, and a shoulder 1860.

In a preferred embodiment, the first end 1805 of the second sleeve 210 is removably coupled to the rear socket 195. In a preferred embodiment, one or more mounting pins are positioned in the mounting holes 1730 and 1820 of the rear socket 195 and second sleeve 210. In this manner, the position of the rear socket 195 relative to the second sleeve 210 is optimally controlled and supported. In a preferred embodiment, the external screw threads 1840 of the first end 1805 of the second sleeve 210 are further removably coupled to the internal screw threads 1630 of the second end 1610 of the front socket 185. In this manner, the ball 180 is contained within and movably coupled to the front socket 185, the rear socket 195 and the second sleeve 210. In a preferred embodiment, one or more conventional O-ring seals are positioned in and supported by the O-ring grooves 1825 and 1855. In this manner, the entry of fluidic materials into the central passageway 1850 is minimized.

In a preferred embodiment, the second end 1810 of the second sleeve 210 is removably coupled to the second cable strength termination member 220. In a preferred embodiment, the internal screw threads 1835 of the second sleeve 210 are removably coupled to the second cable strength termination member 220. In a preferred embodiment, the second cable strength termination member 220 is positioned in intimate contact with and supported by the shoulder 1860. In this manner, the second cable strength termination member 220 is optimally supported.

In a preferred embodiment, the resealable holes 1845 are used to remove moisture and other foreign materials from the interior passageway 1850 of the second sleeve 210. In a preferred embodiment, the resealable holes 1845 are further used to inject a conventional water resistant fluid into the interior passageway 1850 of the second sleeve 210. In this manner, the second cable conductors 215 are optimally protected from the infiltration of external fluidic materials and other foreign materials.

The second sleeve 210 may be fabricated from any number of conventional commercially available materials such as, for example, stainless steel, steel or titanium. In a preferred embodiment, the second sleeve 210 is fabricated from stainless steel in order to optimally provide high strength and corrosion resistance.

The second cable conductors 215 are coupled to the second cable 225, second cable strength member termination 220, and the second mating connector 155. The second cable conductors 215 may comprise any number of conventional commercially available signal conductors such as, for example, copper wire or fiber optic fibers.

Figure 18A:
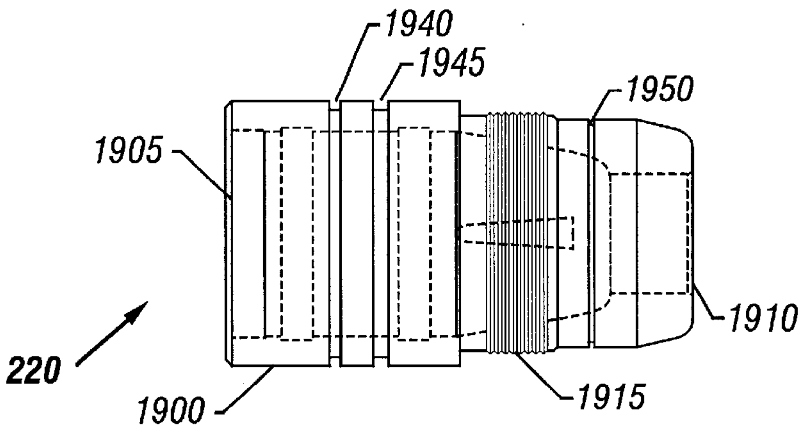
FIG. 18A is a side view of the second cable strength member termination of the flexible connector housing of FIG. 1.
Figure 18B:
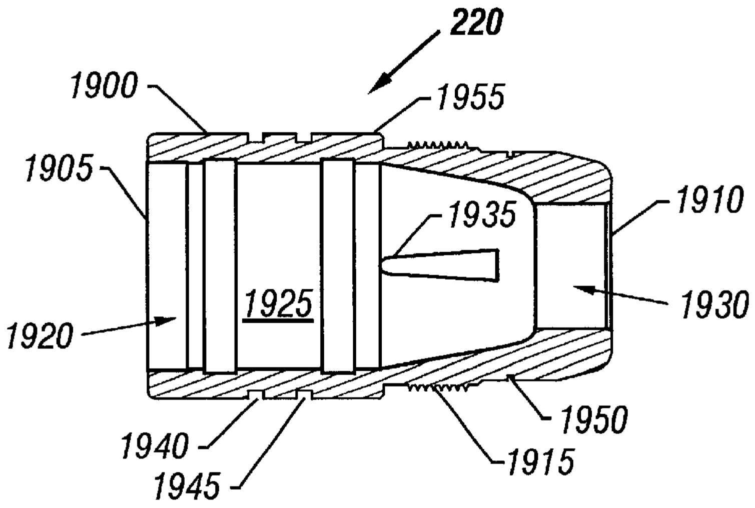
FIG. 18B is a cross-sectional illustration of the first cable strength member termination of FIG. 18A.
Figure 18C:
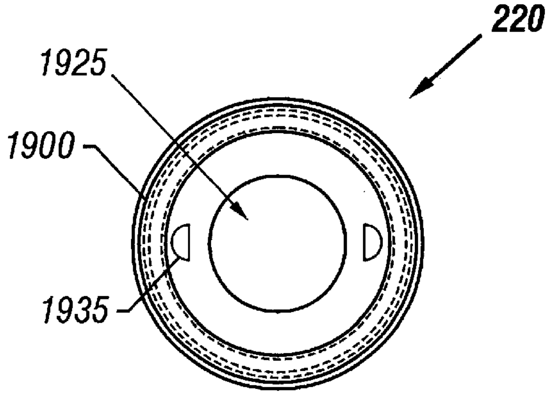
FIG. 18C is a rear view of the first cable strength member termination of FIG. 18A.

The second cable strength termination member 220 is coupled to the second cable 225 and the second sleeve 210. Referring to FIGS. 18A, 18B and 18C, in a preferred embodiment, the second cable strength member 220 includes a housing 1900 having a first end 1905 and a second end 1910, external screw threads 1915, a first opening 1920, a central passageway 1925, a second opening 1930, keying members 1935, O-ring grooves 1940, 1945 and 1950, and shoulder 1955. The second cable strength member 220 preferably mates with and is removably coupled to the second sleeve 210.

The second opening 1930 of the second cable strength member termination 220 is preferably adapted to receive the second cable 225. The central passageway 1925 is further preferably adapted to mate with and support the second cable strength member 235. In this manner, the second cable 225 is optimally supported by the second cable strength member 235. The keying members 1935 preferably are adapted to permit the position of the second cable strength member 235 to be fixed relative to the second sleeve 210. In this manner, the structural support of the second cable 225 is optimized. The O-ring grooves 1940, 1945 and 1950 are preferably adapted to receive one or more O-rings. In this manner, the passage of fluidic materials into the interior passageway 1925 of the second sleeve 220 is minimized.

The second cable strength member termination 220 may be fabricated from any number of conventional commercially available materials such as, for example, stainless steel, steel or titanium. In a preferred embodiment, the second cable strength termination member 220 is fabricated from stainless steel in order to optimally provide high strength and corrosion resistance.

The second cable 225 is preferably coupled to the second cable strength member termination 220 and the second cable conductors 215. The second cable 225 may comprise any number of conventional commercially available cables such as, for example, electrical, optical or a combination of electrical and optical. In a preferred embodiment, the second cable 225 comprises a combination of electrical and optical available from Input/Output, Inc. In a preferred embodiment, the second cable 225 further includes a second cable strength member 235 that mates with and is coupled to the interior of the second cable strength member termination 220. In a preferred embodiment, the first cable strength member 235 is molded onto the second cable 225.

Figure 19:
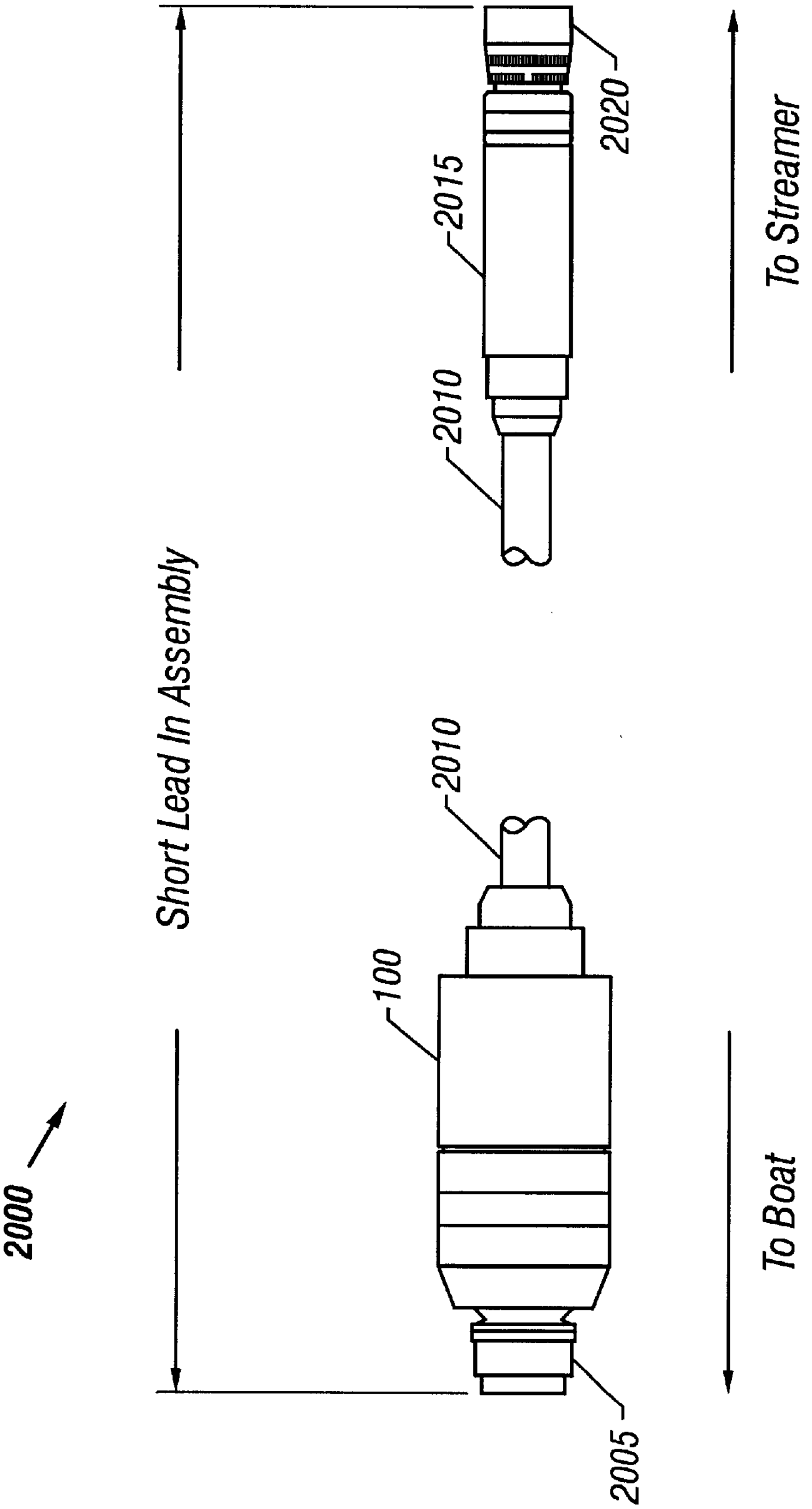
FIG. 19 is an illustration of an embodiment of a lead in assembly for use in coupling a marine seismic streamer to a marine vessel.

Referring to FIG. 19, an embodiment of a lead-in assembly 2000 for coupling a marine seismic streamer to a marine vessel will now be described. The assembly 2000 preferably includes a connector 2005, a flexible connector housing assembly 100, cabling 2010, and an auxiliary cable assembly 2015 having a connector 2020.

The connector 2005 is coupled to the flexible connector housing assembly 100. The connector 2005 is further preferably adapted to be removably coupled to a conventional lead-in cable provided on a marine seismic vessel. The connector 2005 may comprise any number of conventional commercially available connectors such as, for example, connectors available from Veam, Bendix, Cannon, or Deutsch ECD. In a preferred embodiment, the connector 2005 comprises a Veam connector available from Input/Output, Inc.

The flexible connector housing assembly 100 is coupled to the connector 2005 and the cabling 2010. The cabling 2010 may comprise any number of conventional commercially available cablings such as, for example, electrical, optical, or combination of electrical and optical. In a preferred embodiment, the cabling 2010 comprises a combination electrical and optical cabling available from Input/Output, Inc.

The auxiliary connector housing 2015 is coupled to the cabling 2010. The auxiliary connector housing 2015 may comprise any number of conventional commercially available connector housings such as, for example, Input/Output, JDR or Rochester manufactured and sold connector housings. In a preferred embodiment, the auxiliary connector housing 2015 comprises a connector housing available from Input/Output, Inc. In a preferred embodiment, the auxiliary connector housing 2015 further includes a standard connector 2020 for coupling the auxiliary connector housing to a marine seismic streamer.

In a preferred embodiment, the lead-in assembly 2000 is used to provide an interconnect between the marine vessel lead-in cable and the corresponding marine seismic streamer cable. In a preferred embodiment, the lead-in assembly is further used to provide a tow point for the corresponding marine seismic streamer cable. In this manner, the cost of operating a marine seismic survey is significantly reduced. In particular, the use of a shortened and articulated lead-in assembly significantly minimizes the amount of time required to repair or replace a lead-in assembly.

In a preferred embodiment, the length of the lead-in assembly 2000 ranges from about 10 to 60 meters. In this manner, the cost of repairing and/or replacing the lead-in assembly 2000 is greatly reduced.

A flexible connector has been described that includes a connector housing, and a first cable housing. The connector housing includes a first end, a second end and a central passageway. The first end has an approximately spherical outer surface, and the connector housing central passageway is adapted to receive a first connector and a second connector. The first cable housing includes a central passageway and is pivotally coupled to the first end of the connector housing. In a preferred embodiment, the flexible connector further includes a second cable housing coupled to the second end of the connector housing including a central passageway in a preferred embodiment, the flexible connector further includes a first cable termination coupled to the first cable housing adapted to receive a cable. In a preferred embodiment, the flexible connector further includes a second cable termination coupled to the second cable housing adapted to receive a cable. In a preferred embodiment, the first end of the connector housing includes one or more pins and the first cable housing includes one or more corresponding slots that engage the pins. In a preferred embodiment, the slots limit the range of motion of the pins. In a preferred embodiment, the first end of the connector housing includes a plurality of pins symmetrically positioned about the longitudinal axis of the connector housing. In a preferred embodiment, the first cable housing includes a plurality of slots symmetrically positioned about the longitudinal axis of the first cable housing. In a preferred embodiment, the slots are approximately rectangular. In a preferred embodiment, the first cable housing includes a front socket and a rear socket coupled to the front socket. In a preferred embodiment, the first cable housing further includes one or more spherical seals adapted to engage the outer surface of the first end of the connector housing. In a preferred embodiment, the first end of the connector housing includes one or more pins and the rear socket includes one or more corresponding slots that engage the pins. In a preferred embodiment, the slots limit the range of motion of the pins. In a preferred embodiment, the first end of the connector housing includes a plurality of pins symmetrically positioned about the longitudinal axis of the connector housing. In a preferred embodiment, the rear socket includes a plurality of slots symmetrically positioned about the longitudinal axis of the first cable housing. In a preferred embodiment, the slots are approximately rectangular. In a preferred embodiment, the connector housing includes a spherical ball and a connector enclosure coupled to the spherical ball. In a preferred embodiment, the connector enclosure includes a first enclosure and a second enclosure coupled to the first enclosure. In a preferred embodiment, the flexible connector further includes a coupling ring coupled to the first and second enclosures. In a preferred embodiment, the second end of the connector housing includes one or more notches for retaining a connector.

A flexible cable also has been described that includes a connector housing, a first connector, a first cable, a second cable, and a first cable housing. The connector housing includes a first end, a second end and a central passageway. The first end has an approximately spherical outer surface. The first connector is positioned within the central passageway. The first cable is coupled to the first connector. The second connector is positioned within the central passageway. The second cable is coupled to the second cable. The first cable housing includes a central passageway pivotally coupled to the first end of the connector housing. In a preferred embodiment, the flexible cable further includes a second cable housing coupled to the second end of the connector housing including a central passageway. In a preferred embodiment, the flexible cable further includes a first cable termination coupled to the first cable housing adapted to receive the first cable. In a preferred embodiment, the flexible cable further includes a second cable termination coupled to the second cable housing adapted to receive the second cable. In a preferred embodiment, the first end of the connector housing includes one or more pins and the first cable housing includes one or more corresponding slots that engage the pins. In a preferred embodiment, the slots limit the range of motion of the pins. In a preferred embodiment, the first end of the connector housing includes a plurality of pins symmetrically positioned about the longitudinal axis of the connector housing. In a preferred embodiment, the first cable housing includes a plurality of slots symmetrically positioned about the longitudinal axis of the first cable housing. In a preferred embodiment, the slots are approximately rectangular. In a preferred embodiment, the first cable housing includes a front socket and a rear socket coupled to the front socket. In a preferred embodiment, the first cable housing further includes one or more spherical seals adapted to engage the outer surface of the first end of the connector housing. In a preferred embodiment, the first end of the connector housing includes one or more pins, and the rear socket includes one or more corresponding slots that engage the pins. In a preferred embodiment, the slots limit the range of motion of the pins. In a preferred embodiment, the first end of the connector housing includes a plurality of pins symmetrically positioned about the longitudinal axis of the connector housing. In a preferred embodiment, the rear socket includes a plurality of slots symmetrically positioned about the longitudinal axis of the first cable housing. In a preferred embodiment, the slots are approximately rectangular. In a preferred embodiment, the connector housing includes a spherical ball and a connector enclosure coupled to the spherical ball. In a preferred embodiment, the connector enclosure includes a first enclosure and a second enclosure coupled to the first enclosure. In a preferred embodiment, the flexible cable further includes a coupling ring coupled to the first and second enclosures. In a preferred embodiment, the first end of the connector housing includes a first connector retainer for retaining the first connector, and the second end of the connector housing includes a second connector retainer for retaining the second connector. In a preferred embodiment, the second end of the connector housing includes one or more notches for retaining the second connector.

A flexible coupling for coupling a first cable having a first connector to a second cable having a second connector also has been described that includes a ball and a socket. The ball includes an internal passageway adapted to receive the first and second mating connectors. The socket is pivotally coupled to the ball including an internal passageway.

A flexible cable also has been described that includes a first cable, a second cable, a ball, and a socket. The first cable includes a first connector. The second cable includes a second connector coupled to the first connector. The ball includes an internal passageway adapted to receive the first and second mating connectors. The socket is pivotally coupled to the ball and includes an internal passageway.

A method of coupling a first cable to a second cable also has been described that includes providing a ball and socket joint having an internal passageway for coupling the first cable to the second cable. In a preferred embodiment, the method further includes limiting the amount of relative motion between the ball and socket. In a preferred embodiment, the method further includes sealing the interface between the ball and socket.

A lead-in assembly for removably coupling a marine seismic vessel to a marine seismic streamer has also been described that includes an articulated connector assembly and an auxiliary connector assembly coupled to the articulated connector assembly. In a preferred embodiment, the articulated connector assembly is adapted to be removably coupled to the marine seismic vessel. In a preferred embodiment, the auxiliary connector assembly is adapted to be removably coupled to the marine seismic streamer. In a preferred embodiment, the length of the lead-in assembly ranges from about 10 to 60 meters.

A method of removably coupling a marine seismic streamer to a marine seismic vessel has also been described that includes providing a lead-in assembly having an articulated connector assembly. In a preferred embodiment, the length of the lead-in assembly ranges from about 10 to 60 meters.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A flexible cable, comprising:

a connector housing including a first end, a second end and a central passageway, wherein the first end has an approximately spherical outer surface;

a first connector positioned within the central passageway;

a first cable coupled to the first connector;

a second connector positioned within the central passageway;

a second cable coupled to the second connector;

a first cable housing including a central passageway pivotally coupled to the first end of the connector housing.

2. The flexible cable of claim 1, further including:

a second cable housing coupled to the second end of the connector housing including a central passageway.

3. The flexible cable of claim 2, further including a second cable termination coupled to the second cable housing adapted to receive the second cable.

4. The flexible cable of claim 1, further including a first cable termination coupled to the first cable housing adapted to receive the first cable.

5. The flexible cable of claim 1, wherein the first end of the connector housing includes one or more pins; and wherein the first cable housing includes one or more corresponding slots that engage the one or more pins.

6. The flexible cable of claim 5, wherein the slots limit the range of motion of the one or more pins.

7. The flexible cable of claim 5, wherein the first end of the connector housing includes a plurality of pins symmetrically positioned about the longitudinal axis of the connector housing.

8. The flexible cable of claim 5, wherein the first cable housing includes a plurality of slots symmetrically positioned about the longitudinal axis of the first cable housing.

9. The flexible cable of claim 5, wherein the slots are approximately rectangular.

10. The flexible cable of claim 1, wherein the first cable housing includes:

a front socket; and a rear socket coupled to the front socket.

11. The flexible cable of claim 10, wherein the first cable housing further includes:

one or more spherical seals adapted to engage the outer surface of the first end of the connector housing.

12. The flexible cable of claim 10, wherein the first end of the connector housing includes one or more pins; and wherein the rear socket includes one or more corresponding slots that engage the one or more pins.

13. The flexible cable of claim 12, wherein the slots limit the range of motion of the one or more pins.

14. The flexible cable of claim 12, wherein the first end of the connector housing includes a plurality of pins symmetrically positioned about the longitudinal axis of the connector housing.

15. The flexible cable of claim 12, wherein the rear socket includes a plurality of slots symmetrically positioned about the longitudinal axis of the first cable housing.

16. The flexible cable of claim 12, wherein the slots are approximately rectangular.

17. The flexible cable of claim 1, wherein the connector housing includes:

a spherical ball; and a connector enclosure coupled to the spherical ball.

18. The flexible cable of claim 7, wherein the connector enclosure includes:

a first enclosure; and a second enclosure coupled to the first enclosure.

19. The flexible cable of claim 8, further including:

a coupling ring coupled to the first and second enclosures.

20. The flexible cable of claim 1, wherein the first end of the connector housing includes a first connector retainer for retaining the first connector; and wherein the second end of the connector housing includes a second connector retainer for retaining the second connector.

21. The flexible cable of claim 1, wherein the second end of the connector housing includes one or more notches for retaining the second connector.

* * * * *